Patented Nov. 10, 1942

2,301,564

UNITED STATES PATENT OFFICE 2,301,564

SAUSAGE CASING AND METHOD OF PRO-
DUCING MARKED SAUSAGE

Louis J. Menges, St. Louis, Mo.

No Drawing. Application July 1, 1940,
Serial No. 343,435

7 Claims. (Cl. 99—176)

My invention relates to means for applying trade-mark or other indicia to the surface of sausage and other molded food products. At the present time cellulose casings are being used to a large extent in lieu of animal casings in the manufacture of weiner sausages, bologna sausage and the like, casings of this type being illustrated, for example, in Freund United States Patent No. 1,959,978. In many instances these casings are removed before the sausages are packed for sale to retail customers, but so far as known to me, no efficient and inexpensive means has heretofore existed whereby such "skinless" sausages can be marked with a trade-mark or name identifying the manufacturer or the nature or quality of the product itself.

Cellulose sausage casings are commonly prepared by extruding viscose solution in tubular form and subjecting it to coagulation and other treatments whereby a thin walled transparent casing is formed having sufficient tensile strength for stuffing with sausage in the manner commonly employed in forming sausages by the use of animal casings. After the stuffing operation the sausages are usually smoked and then are immersed in hot water at a temperature of about 135 degrees for a period of ten to fifteen minutes and are then in condition for sale or, if the sausages are to be sold without the casing, the latter is then stripped off, the sausage retaining its molded form resulting from the use of the casing and from the treatment while contained therein.

While it is possible to apply a manufacturer's brand to such sausage after the casing is removed, by hand operation by means of an ordinary ink pad and stamp, such method is tedious, expensive and very likely to be unsanitary.

In accordance with my invention, the marking which is desired to appear upon the finished sausage after the cellulose casing is removed, is printed on the casing before it is stuffed, by means of a water soluble ink, an aniline ink of the kind now permitted by the Bureau of Animal Industry to be applied to edible meat products being suitable. An ink of this type which is now in general use to indicate inspection of meat, consists of grain alcohol, methyl violet, cane sugar and water, and has been successfully used in carrying out my invention.

From the printing press the lengths of casing pass through an area maintained at suitable temperature for drying of the ink and after the ink is dry, the markings are then over-printed with a film of substantially waterproof and preferably transparent material which is subsequently also dried. A waterproofing material which I have found suitable embodies the following ingredients in parts by volume: rubber resin (marketed under the trade-name "Pliolite") 1.35; ethyl cellulose .75; paraffin wax .25; toluol 5.85; and naphtha 6. Generally speaking, any non-poisonous material or materials by means of which a substantially waterproof film can be applied over the printed matter and which will adhere to the casing surface, are suitable.

The purpose of applying the waterproofing material is to prevent the ink from being carried away from the surface of the casing by the water of the cooking bath above referred to and retain it in a position to pass through the casing wall to the adjacent surface of the meat during operations subsequent to the stuffing, and reproduce the markings in clear outlines thereon. I have found that during the period between the stuffing of the sausage into the casing and the final removal from the cooking bath, substantially all of the ink pigment permeates the casing wall and is transferred to the adjacent surface of the meat and reproduces the marking quite clearly and legibly thereon. The ink pigment is not absorbed by the cellulose in a manner causing any blur and appears to pass directly through the casing wall from its originally printed position to the surface of the sausage meat. While I do not wish to be bound to any theory as to cause or causes of such permeation of the casing wall by the ink and absorption by the meat in a manner resulting in reproduction on the meat of the marking that was applied to the casing, I assume that it is due to capillary action in the presence of moisture in the sausage emulsion, the passage of the ink through the casing wall possibly being facilitated by the effect on the casing material of the heat of the cooking bath.

In the claims the word "cellulose" is used to include not only the cellulose material now generally used in the manufacture of sausages but also casings made from cellulose derivatives which have similar ink permeable characteristics whereby the desired transfer of marking from the casing to the contained product may be achieved and the word "sausage" includes wiener sausages, bologna sausages and other units made by stuffing comminuted meat or mixtures of meat and other material into casings.

While I have mentioned particular materials herein, I do not intend that the scope of the invention covered hereby be limited other than as required by the appended claims.

Having fully described my invention, what I claim as new and desire to secure by Letters Patent of the United States is:

1. The method of manufacture of marked "skinless" sausage which comprises stuffing the sausage material into a cellulose casing bearing a marking on the outer surface thereof formed by means comprising a pigment which, in the presence of moisture, passes through the casing wall to the surface of the sausage material.

2. A new article of manuacture for use in forming marked "skinless" sausage units which comprises a water penetrable casing for receiving and forming the sausage units, said cellulosic casing bearing a marking on the outer surface thereof formed by means comprising a pigment transferable by moisture through the casing wall, the outer surface of said marking being covered by a substantially waterproof film.

3. A cellulose casing for use as a container of a comminuted food product, said casing bearing an imprint in water soluble ink on its outer surface and a waterproof film overlying said imprint, said ink embodying a pigment which, in the presence of moisture effective on the interior surface of the casing, passes through the casing wall to the adjacent surface of the contained food product.

4. A cellulose casing for forming units of sausage or other comminuted food material, said casing bearing on the outer surface thereof a legend imprinted by means of an ink comprising an edible pigment in water soluble condition, and a substantially waterproof coating over said legend.

5. A method of preparation of a water penetrable casing for forming units of sausage or other comminuted food material which comprises printing a marking on the surface of the casing by means of ink embodying a water soluble pigment, drying said ink, and then over-printing said marking with a material which when dried forms a substantially waterproof film.

6. A method of preparation of a cellulose casing for forming units of sausage or other comminuted food material which comprises printing a marking on the surface of the casing by means of ink comprising methyl violet, sugar and water, drying said ink, and then over-printing said marking with a material which when dried forms a substantially waterproof film.

7. The method of forming a "skinless" wiener type sausage bearing on its surface a trade-mark or other indicia which consists in stuffing moist sausage material into a cellulose casing provided with a marking on its outer surface, said marking comprising a pigment transferable through the casing wall to the surface of the contained sausage by the moisture therein, said marking being protected on its outer surface against water of a cooking bath, and then subjecting said filled casing to curing operation including cooking.

LOUIS J. MENGES.